United States Patent
Zhao et al.

(10) Patent No.: US 6,392,195 B1
(45) Date of Patent: May 21, 2002

(54) HEATED STEERING WHEEL

(75) Inventors: Li Zhao, West Bloomfield; Scott G. Warhover, Commerce Township, both of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/723,138

(22) Filed: Nov. 27, 2000

(51) Int. Cl.[7] .................................................. B60L 1/02
(52) U.S. Cl. ........................................................ 219/204
(58) Field of Search ................................ 219/202, 204, 219/528, 529, 544, 545, 547, 548, 549

(56) References Cited

U.S. PATENT DOCUMENTS

| | | | |
|---|---|---|---|
| 2,631,219 A | 3/1953 | Suchy | |
| 2,835,777 A | * 5/1958 | Gates et al. | 219/204 |
| 3,165,620 A | * 1/1965 | Miller | 219/204 |
| 4,060,710 A | * 11/1977 | Reuter et al. | 219/548 |
| 4,547,655 A | * 10/1985 | Kurata et al. | 219/204 |
| 4,549,069 A | * 10/1985 | Oge | 219/528 |
| 4,631,976 A | 12/1986 | Noda et al. | 74/552 |
| 4,640,340 A | 2/1987 | Noda et al. | 165/41 |
| 4,764,665 A | * 8/1988 | Orban et al. | 219/549 |
| 5,847,360 A | 12/1998 | Lorenzen et al. | 219/204 |
| 5,928,548 A | * 7/1999 | Johansson | 219/528 |
| 6,093,908 A | 7/2000 | Haag | 219/200 |
| 6,229,123 B1 | * 5/2001 | Kochman et al. | 219/549 |

FOREIGN PATENT DOCUMENTS

| | | |
|---|---|---|
| EP | 1026066 | 8/2000 |
| WO | 9112701 | 8/1991 |

* cited by examiner

Primary Examiner—Sang Paik
(74) Attorney, Agent, or Firm—Jarett Rieger

(57) ABSTRACT

A heated steering wheel having a heated element that provides a uniform distribution of heat throughout the rim of the steering wheel. The heating element is a thin fabric woven made from nylon coated with silver and has a constant temperature coefficient. The heated steering wheel provides a foam layer surrounding the heating element, and this layer prevents the leather wrapping from being uneven due to the presence of the bus bar. The heating element can also be used in a steering wheel having a wood veneer shell.

14 Claims, 2 Drawing Sheets

HEATED STEERING WHEEL

FIELD OF THE INVENTION

The invention relates to a vehicular steering wheel capable of being evenly heated.

BACKGROUND OF THE INVENTION

It has long been considered desirable to have a heating system for the vehicular steering wheel.

During cold weather while a vehicle is not in operation, a vehicular steering wheel can become bitterly cold. When an operator of a vehicle initially grasps the steering wheel, he may experience discomfort, and this discomfort can persist until the steering wheel warms up. The discomfort can cause a lapse in the operator's concentration and could potentially adversely affect his driving performance. For individuals suffering from arthritis and other diseases of the hand, the discomfort from the cold steering wheel can be acute. Even after the vehicle itself has reached a comfortable temperature, the steering wheel usually remains cold to the touch and might require the use of gloves by the driver. For the above-mentioned reasons, there has been a desire to develop a means to rapidly increase the temperature of a vehicle steering wheel.

There have been a number of proposals for this steering wheel problem such as the use of hot air, heated coolants, and electric resistance (resistance wire technology). The use of resistance wire technology became the most popular method of tackling this problem. This method achieved the goal of warming a steering wheel by using lengths of resistance wire as heating elements. The wire was embedded within the steering wheel and the passage of electrical current through the wire would generate heat. Thus the popularity of this method stemmed from its simplicity and reliability. An advantage of using resistance wire is the flexible installation possibilities; however, the major drawback to this technology is that the steering wheel does not uniformly increase in temperature. Use of resistance wire would create areas or zones on the steering wheel that was cold to the touch and areas or zones that were warm to the touch. Also, the resistance wire is much easier to be damaged, once the wire is broken at any place along the steering wheel rim, the wheel will no longer be able to be heated.

DESCRIPTION OF PRIOR ART

Noda et al., U.S. Pat. No. 4,640,340, teaches an apparatus for heating and cooling a steering wheel. In Noda et al., the thermoelectric transducers are responsible for generating or absorbing heat. The thermoelectric transducer either generates heat or absorbs heat depending on which direction the electric current flows. The thermoelectric transducers are situated below a conductive plate, which is situated underneath the skin layer.

Lorenzen et al., U.S. Pat. No. 5,847,360, teaches an electric steering wheel heating element mounting on top of a steering wheel rim. The heating element is made of three electrically conductive segments: one linear segment and two curved adjacent segments.

Haag et al., U.S. Pat. No. 6,093,908, teaches a heated steering wheel having a heating element made from a carbon fiber woven material. The heating element has the unique property of a negative temperature coefficient.

SUMMARY OF THE INVENTION

The object of this invention is to provide a steering wheel that is capable of being uniformly heated. According the present invention the heated steering wheel comprises an armature, a substrate, a heating element, a foam layer, and a leather wrapping. The heating element in the present invention is a thin fabric woven made from nylon coated with silver. The foam layer is positioned around the heating element and is made from a material that is substantially conductive so that heat generated from the heating element can reach the surface of the steering wheel rim. The foam layer is included in the heated steering wheel to conceal the presence of the bus bar.

It is a further object of this invention to provide such heated steering wheel, which is durable and can withstand the stress and strain placed on the steering wheel by the driver during the operation of the vehicle.

BRIEF DESCRIPTION OF THE DRAWINGS

Exemplary embodiments of the invention are explained in greater detail below with reference to drawings, in which.

DETAILED DESCRIPTION OF THE INVENTION

Figure 1:
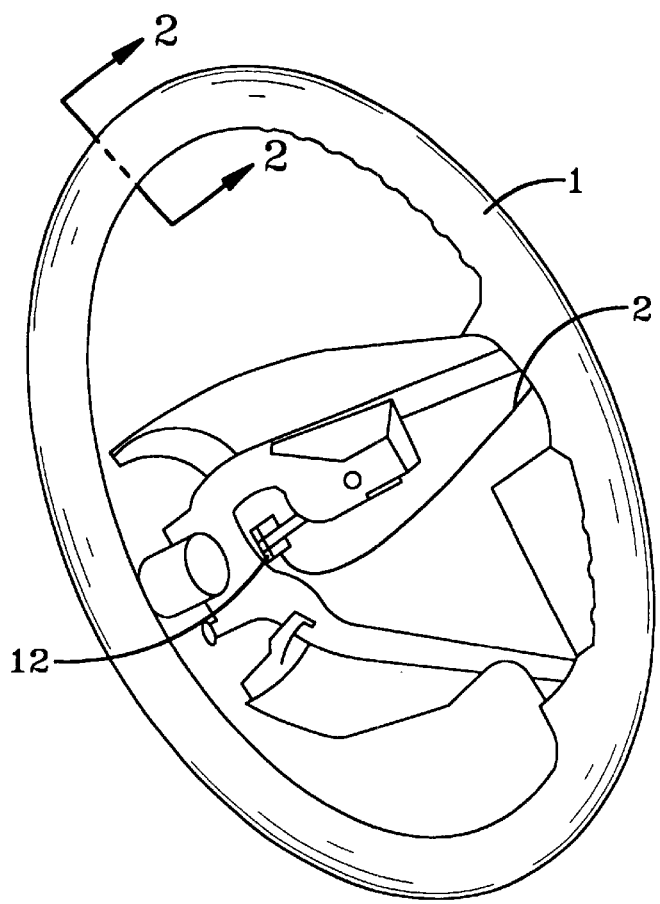
FIG. 1. is a perspective view of a heated steering wheel.

The heated steering wheel comprises a conventional vehicle steering wheel, which can be of any desired shape and dimension. FIG. 1 shows an exemplary steering wheel for an automobile. The steering wheel includes an outer rim 1, and a spoke cavity 2.

Figure 2:
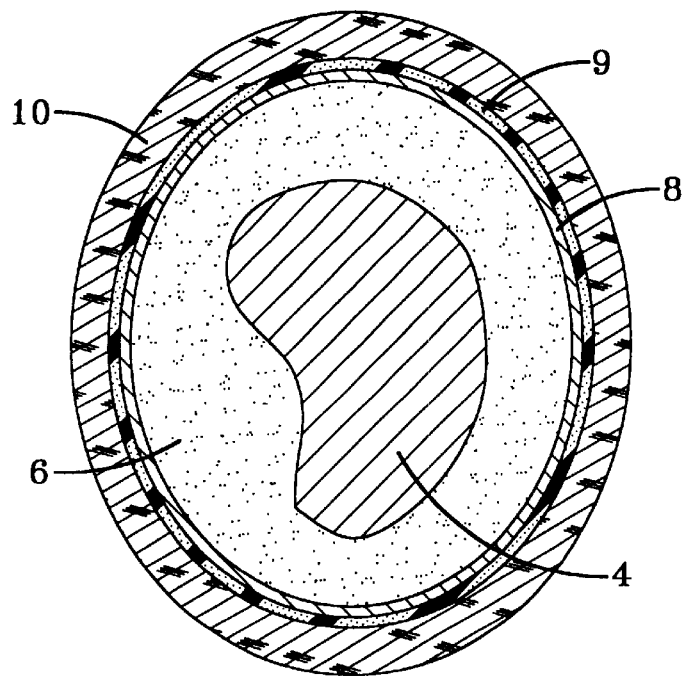
FIG. 2. is a cross sectional view of the heated steering wheel rim in FIG. 1. along section line 2—2.

As shown in FIGS. 1 and 2, the steering wheel includes a frame or an armature 4 that defines the shape of the steering wheel. Preferably, the armature is made from the metal such as aluminum or magnesium. A substrate 6 encloses the armature of the steering wheel providing cushion to the steering wheel. The substrate is a foam and can be made from cellular urethane or neoprene.

Figure 3:
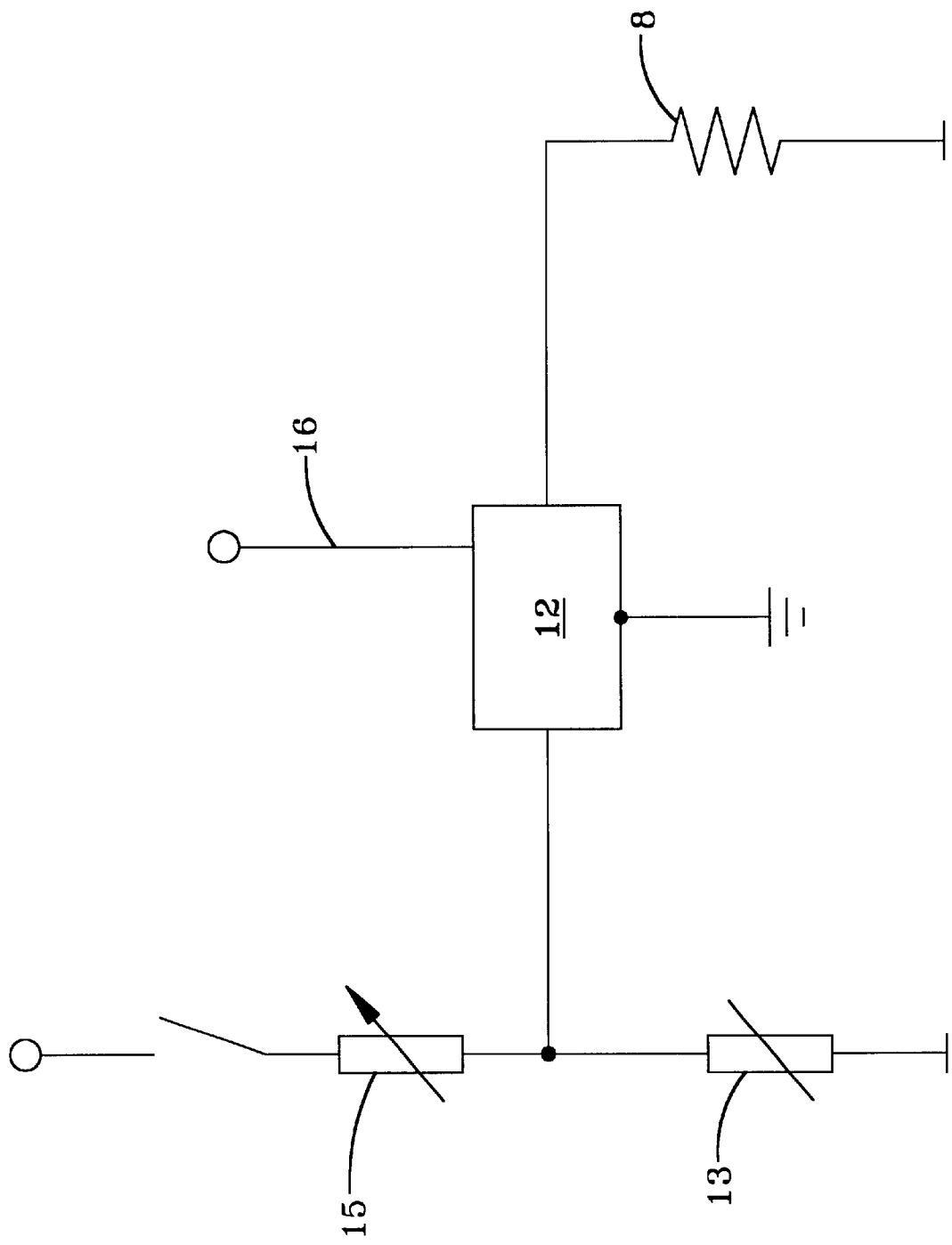
FIG. 3. is a circuit diagram for the heated steering wheel.

According to the present invention, the vehicular steering wheel has a heating systems comprising a heating element 8, wire harness, temperature sensor 13, switch 15, power source 16, and temperature controller 12. FIG. 3 shows an exemplary electrical circuit containing the foregoing components.

The heating element 8 is a thin fabric woven made from nylon coated with silver. The resulting fabric is very flexible and contains a two-dimensional conductive array. This allows the fabric to be cut into a variety of shapes and still function effectively. The heating element includes an electrically conductive metalized fabric. The heating element used in the present invention is purchased from Warme-und Elektrotechnik B. Automotive Systems Ltd. (W.E.T.). The heating element is fastened directly to the substrate of the steering wheel, and is wrapped around at least part of the steering wheel rim. Preferably, all of the steering wheel rim is wrapped with the heating element, but a lesser amount could be wrapped leaving a gap at the seam. A possible attachment method is by having one side of the fabric coated with an adhesive film. The heating element can also be attached to the substrate 6 by a thin double stick tape.

One skilled in the art will appreciate that the heating element 8 can have a negative temperature coefficient, positive temperature coefficient, and a constant temperature coefficient. For the steering wheel application, the voltage is kept constant. If a heating element has a negative temperature coefficient while the voltage is kept at a constant, there is an inverse relationship between the temperature and the resistance. Hence, as the temperature is decreased, the heat generated is diminished. If a steering wheel has a constant temperature coefficient, then temperature change does not have a bearing on the amount of heat produced. In the claimed invention, the heating element has a constant temperature coefficient and thus a decrease in temperature does not have an adverse affect on the heat generation.

A foam layer 9 surrounds the heating element of the steering wheel. The purpose of the foam layer is to hide the heating element as well as the bus bar, which is two thin metal strips at the two ends of the heating element. An important characteristic of the foam is that it is substantially thermally conductive because the foam is disposed between the leather wrap 10 and the heating element 8. It is highly undesirable for the foam to insulate because this will elongate the time necessary to heat the steering wheel. Several different foam materials may be used for the present invention including Ensolite AMC, Poron 4701-40, and Rubatex 1400 N. Ensolite AMC foam is a butadiene acrylonitrile rubber and was purchased from RBX Corporation. Poron 4701-40 is a polyurethane foam and was purchased from Rogers Corporation. Lastly, Rubatex 1400 N is a neoprene foam and was purchased from RBX Corporation. Those skilled in the art will appreciate that other foam materials can be employed in the heating steering wheel. The preferred thickness range for the foam layer is 1.5 mm to 2.5 mm.

The heated steering wheel may include a foam layer underneath the heating element (not shown in the figures). This foam layer needs to have very little thermal conductivity to allow the heat to more efficiently be channeled to the outside portion of the steering wheel rim.

The heated steering wheel in FIG. 2 includes an outer covering made from leather 10. It is understood that the heating element disclosed herein may also be used in a steering wheel having an outer shell made from wood veneer. Furthermore, the heated steering wheel can properly function in a steering wheel made from leather, wood veneer, fiberglass, and other exterior material.

A temperature sensor 13, often called a negative temperature coefficient sensor (hereinafter referred to as "NTC"), is used to monitor the actual temperature of the steering wheel surface. The information from the temperature sensor is used to determine the intervals of operation of the heating element.

The temperature controller 12 reads the condition of the temperature sensor and makes the determination of when to turn the heating element on and off. The controller has been designed to turn the heating element on and off electronically rather than electromechanically to eliminate audible noise and greatly reduce electromagnetic signal emission. Preferably, the temperature controller is installed in the spoke cavity of the steering wheel.

The wire harness provides the interconnection among the various system components and the power leads coming from a power source 16 clockspring or slipring. Preferably, the wire harness includes a fuse to protect the controller from a voltage surge.

The switch 15 may be either an on-off switch or a multiple position switch allowing a choice of temperature settings. The switch may be located on the steering wheel or elsewhere in the vehicle such as the arm rest or instrument panel. The switch can be designed to have six different positions or preferably can be three position switch (low-high-off).

According to the present invention, the heating element can be used in a full leather wrapping steering wheel. The method for assembling the full leather wrapping steering wheel comprises the following steps. First, the seams for two pieces of leather are machine sewn. Next, the grooves on the base steering wheel are cut for burying the wire harness. A steering wheel base is understood to be a metal armature having at least a rim that is encased with a substrate. Then, adhesive is applied over a foam padding and leather pieces, followed by the foam padding being applied over the leather. Next the cover tape is peeled from the heating element, and the heating element is attached over the foam. It is important to place the busbar at the correct relative location over the foam and leather, so when they are assembled over steering wheel rim, the busbar will be at 3 and 9 o'clock position.

The sub-assembly of the heating element with the foam padding and leather are applied onto the steering wheel rim. The wire harness is then adjusted into the groove and the NTC is applied in between the sub-assembly of the heating element, foam, and leather with the steering wheel substrate. Next, adhesive is applied in between the heating element and the steering wheel rim. Subsequently, the leather is sewn. Finally the excessive leather is trimmed at the spoke area, excessive adhesive is removed, and the leather is heated to remove the wrinkles.

According the present invention, the heating element can be used in a wood shell and leather wrapping steering wheel. The method for assembling the wood shell and leather wrapping steering wheel is similar to the method for assembling the full leather wrapping steering wheel. The major difference is that the wood shell and leather wrapping steering wheel has an outer covering for the steering wheel rim comprising wood veneer and leather. For the leather wrapping steering wheel, only leather is used for the outer covering. Notwithstanding the addition of wood veneer to the steering wheel, the methods for the wood shell and leather wrapping steering wheel and full leather wrapping steering wheel are the same.

From the above description of the preferred embodiments, those skilled in the art will perceive improvements, changes, and modifications. Such improvements, changes, and modifications are considered to be within the spirit and scope of the present invention as disclosed in the foregoing description and defined by the appended claims.

We claim:

1. Heated steering wheel for a vehicle, comprising:
    (a) an armature providing a shape for the steering wheel;
    (b) a substrate surrounding the armature;
    (c) a heating element fastened to the substrate of the steering wheel, wherein said heating element includes an electrically conductive woven fabric, said heating element is made from nylon and is coated with silver, said heating element has a constant temperature coefficient for eliminating the effect of the temperature of the heating element on the amount of heat generated by the heating element; and
    (d) a foam layer positioned over the heating element, wherein the foam layer has a thickness in the range of 1.5 mm to 2.5 mm.

2. Heated steering wheel according to claim 1, wherein the foam layer is made from polyurethane.

3. Heated steering wheel according to claim 1, wherein the foam layer is made from neoprene.

4. Heated steering wheel according to claim 1, wherein the foam is substantially thermally conductive.

5. Heated steering wheel according to claim 1, wherein the heating element is fastened to the foam layer by an adhesive film.

6. A heated steering wheel according to claim 1, wherein the heating element is fastened to the foam layer by double stick tape.

7. A heated steering wheel according to claim 1 further comprising a temperature controller that controls the actuation of the heating element.

8. A heated steering wheel according to claim 1 further comprising a temperature sensor for sensing the temperature of the steering wheel.

9. A heated steering wheel according to claim 1 further comprising a leather wrapping positioned around the foam layer.

10. A vehicular steering wheel rim, comprising:
    (a) an armature providing a shape for the steering wheel;
    (b) a substrate layer surrounding the armature;
    (c) a heating element fastened to the substrate of the steering wheel, wherein said heating element includes an electrically conductive woven fabric, said heating element is made from nylon and is coated with silver, said heating element has a constant temperature coefficient for eliminating the effect of the temperature of the heating element on the amount of heat generated by the heating element;
    (d) a leather wrapping for decorating the steering wheel; and
    (e) a foam layer disposed between the leather wrapping and the substrate layer, wherein the foam layer has a thickness in the range of 1.5 mm to 2.5 mm.

11. A heated steering wheel according to claim 10, wherein the foam is substantially thermally conductive.

12. A vehicular steering wheel rim, comprising:
    (a) an armature providing a shape for the steering wheel;
    (b) a substrate layer surrounding the armature;
    (c) a heating element fastened to the substrate of the steering wheel, wherein said heating element includes an electrically conductive woven fabric, said heating element is made from nylon and is coated with silver, said heating element has a constant temperature coefficient for eliminating the effect of the temperature of the heating element on the amount of heat generated by the heating element;
    (d) a wood veneer shell for decorating the steering wheel; and
    (e) a foam layer disposed between the leather wrapping and the substrate layer, wherein the foam layer has a thickness in the range of 1.5 mm to 2.5 mm.

13. A heated steering wheel according to claim 12, wherein the foam is substantially thermally conductive.

14. A method of manufacturing a heated steering wheel comprising the steps of:
    (a) providing a steering wheel base that is adapted to receive supply electrical conducting elements;
    (b) providing a piece of leather having a shape adapted for fitting around a rim of a steering wheel base;
    (c) attaching foam padding to the leather;
    (d) attaching a heating element having a constant temperature coefficient for eliminating the effect of the temperature of the heating element on the amount of heat generated by the heating element and electrical supply conducting elements to the foam padding, the heating element is made from nylon and is coated with silver, wherein the foam layer has a thickness in the range of 1.5 mm to 2.5 mm; and
    (e) securing the product of steps d to the steering wheel base with the heating element next to the steering wheel base.

* * * * *